US006014469A

United States Patent [19]

Eschbach

[11] Patent Number: 6,014,469

[45] Date of Patent: Jan. 11, 2000

[54] SYSTEM AND METHOD FOR SELECTIVELY NOISE-FILTERING DIGITAL IMAGES

[75] Inventor: Reiner Eschbach, Webster, N.Y.

[73] Assignee: Xerox Corporation, Stamford, Conn.

[21] Appl. No.: 08/801,510

[22] Filed: Dec. 31, 1996

[51] Int. Cl.[7] .............................. G06K 9/40; G06K 9/46; G06T 5/00; G06T 5/40

[52] U.S. Cl. .......................... 382/261; 382/168; 382/195; 382/206

[58] Field of Search .................................... 382/261, 260, 382/264, 275, 168, 171, 172, 167, 206, 195; 358/522, 518, 463

[56] References Cited

U.S. PATENT DOCUMENTS

| | | | |
|---|---|---|---|
| 4,783,839 | 11/1988 | Bamber | 382/261 |
| 5,023,919 | 6/1991 | Wataya | 382/263 |
| 5,081,691 | 1/1992 | Chesley | 382/261 |
| 5,144,566 | 9/1992 | Anderson et al. | 382/168 |
| 5,347,374 | 9/1994 | Fuss et al. | 358/522 |
| 5,371,615 | 12/1994 | Eschbach | 358/518 |
| 5,414,538 | 5/1995 | Eschbach | 358/522 |
| 5,450,502 | 9/1995 | Eschbach et al. | 358/522 |
| 5,653,234 | 8/1997 | Kim et al. | 382/264 |

OTHER PUBLICATIONS

Lee Jong–Sen; "Digital Image Smoothing and the Sigma Filter," Computer Vision, Graphics, and Image Processing, vol. 24, pp. 255–269, 1983.

*Primary Examiner*—Scott Rogers

*Attorney, Agent, or Firm*—Oliff & Berridge, PLC

[57] ABSTRACT

A system and method for noise filtering digital images is implemented in an automated image enhancement system without significantly reducing the performance of the automated image enhancement system. The system and method trigger a noise filter based on image measurements. If the image measurements indicate that the likelihood of objectionable "noise" in the image is high, a noise filter is triggered. Otherwise the noise filter is not triggered. In this way, only images that are in need of noise filtering are filtered, while other images are processed without the additional performance overhead required by the noise filter.

26 Claims, 10 Drawing Sheets

SYSTEM AND METHOD FOR SELECTIVELY NOISE-FILTERING DIGITAL IMAGES

BACKGROUND OF THE INVENTION

1. Field of Invention

This invention relates to a system and method for improving the appearance of a digital image. More specifically, this invention is directed to a system and method for efficiently reducing image noise or "speckle" in digital images.

2. Description of Related Art

In the past, copiers or scan-to-print image processing systems were typically used to reproduce an input image as accurately as possible, i.e., to render a copy. Copies are intentionally rendered as accurately as possible, including any flaws present in the original input image. However, as customers become more knowledgeable in their document reproduction requirements, they recognize that an exact copy is often not actually desired. Instead, they desire to obtain the best document output.

Until recently, output image quality of a copier or a scan-to-print system was directly related to the input document quality. One common set of input documents includes photographs. Unfortunately, photography is an inexact science, and original photographs are often of poor quality. In addition, technology, age and/or image degradation variations often result in pictures having an unsatisfactory and undesirable appearance. Therefore, a copy giving the best possible picture is desired, rather than an exact copy of the original image.

Photography has long dealt with this issue. Analog filters and illumination variations can improve the appearance of pictures in analog photographic reproduction processes. For example, yellow filters enhance the appearance of white clouds against a blue sky in black and white images. Furthermore, various electrophotographic devices, including digital copiers, can clean up and improve images by adjusting threshold values, image filters and/or background suppression levels. Generally, these methods are manual methods in which a user must select various image adjustment operations on an image by image basis. Typically, the casual user is not skilled enough to perform these operations, especially when the electrophotographic device includes color controls.

Three possible choices are currently available to enhance an image. The first choice is doing nothing. Such a system is a stable system, in that it does no harm to an image. This is a common reproduction approach. However, the output quality of documents produced by these systems are sometimes not satisfactory to the ultimate customer.

The second choice is to process all images. An improvement can usually be made to an image if certain assumptions are made that are accurate for most cases. In an exceptionally large subset of images, increasing contrast, sharpness and/or color saturation will improve these images. This reproduction process tends to produce better images. However, the process is unstable because, for multi-generation copying, increases in contrast, saturation or sharpness are undesirable and ultimately lead to severe image degradation. Furthermore, the process may undesirably operate on high quality images.

The third choice is an automated image enhancement process which operates to vary images which are not perceived as high quality images, but does not operate on images which do not need to be improved.

Many improvements can be made to an image using automated image enhancement techniques, including exposure adjustment, described in U.S. Pat. No. 5,414,538 to Eschbach, color balance correction, described in U.S. Pat. No. 5,371,615 to Eschbach, and contrast enhancement, described in U.S. Pat. No. 5,450,502 to Eschbach et al., each herein incorporated by reference in their entireties.

Generally, these processing methods operate by modifying a set of tone reproduction curves. The output image is achieved by using tone reproduction curves, operating either on the luminescence channel expressed in $LC_1C_2$ coordinates or, preferably, on each channel in a color density space description of the image in red-green-blue (RGB) coordinates. A method of cascading or serially ordering such processing is described in U.S. Pat. No. 5,347,374 to Fuss et al., herein incorporated by reference in its entirety.

The automated image enhancement techniques described above attempt to automatically improve the perceived quality of natural scene images by estimating and appropriately modifying the overall exposure, contrast, color balance, saturation and sharpness of the input image. However, one source of image degradation, image noise or "speckle", is not addressed by these techniques. Image noise is not addressed by the above automated image advancement techniques because a noise filter, including even a simple low-pass filter, takes a considerable amount of time to operate on the input image. This undesirably reduces the overall performance of the system. Specifically, a noise filter reduces performance of an automated image enhancement system by as much as 50%.

SUMMARY OF THE INVENTION

This invention provides a system and method for noise-filtering digital images implemented in automated image enhancement systems without significantly reducing the performance of the automated image enhancement system.

The system and method of this invention trigger a noise filter based on the results of image measurements. If the image measurements indicate that the likelihood of objectionable "noise" in the image is high, a noise filter is triggered. Otherwise, the noise filter is not triggered. In this way, only images that are in need of noise filtering are filtered, while other images are processed without the additional performance overhead required by the noise filter.

In a preferred embodiment, the system and method trigger a noise filter only if the image is darker than a predetermined threshold, and if an image's contrast is below a predetermined threshold.

In the preferred embodiment, the noise filter comprises a single modified sigma filter that reduces both "random" noise and "shot" noise. Thus, a user does not have to monitor the type of noise present in the image and manually select between a random noise filter and a shot noise filter.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 4 shows an example image;

FIG. 10 is an image corresponding to FIG. 5, where the methods of this invention have been used to filter "random" noise and "shot" noise.

DETAILED DESCRIPTION OF PREFERRED EMBODIMENTS

Figure 1:
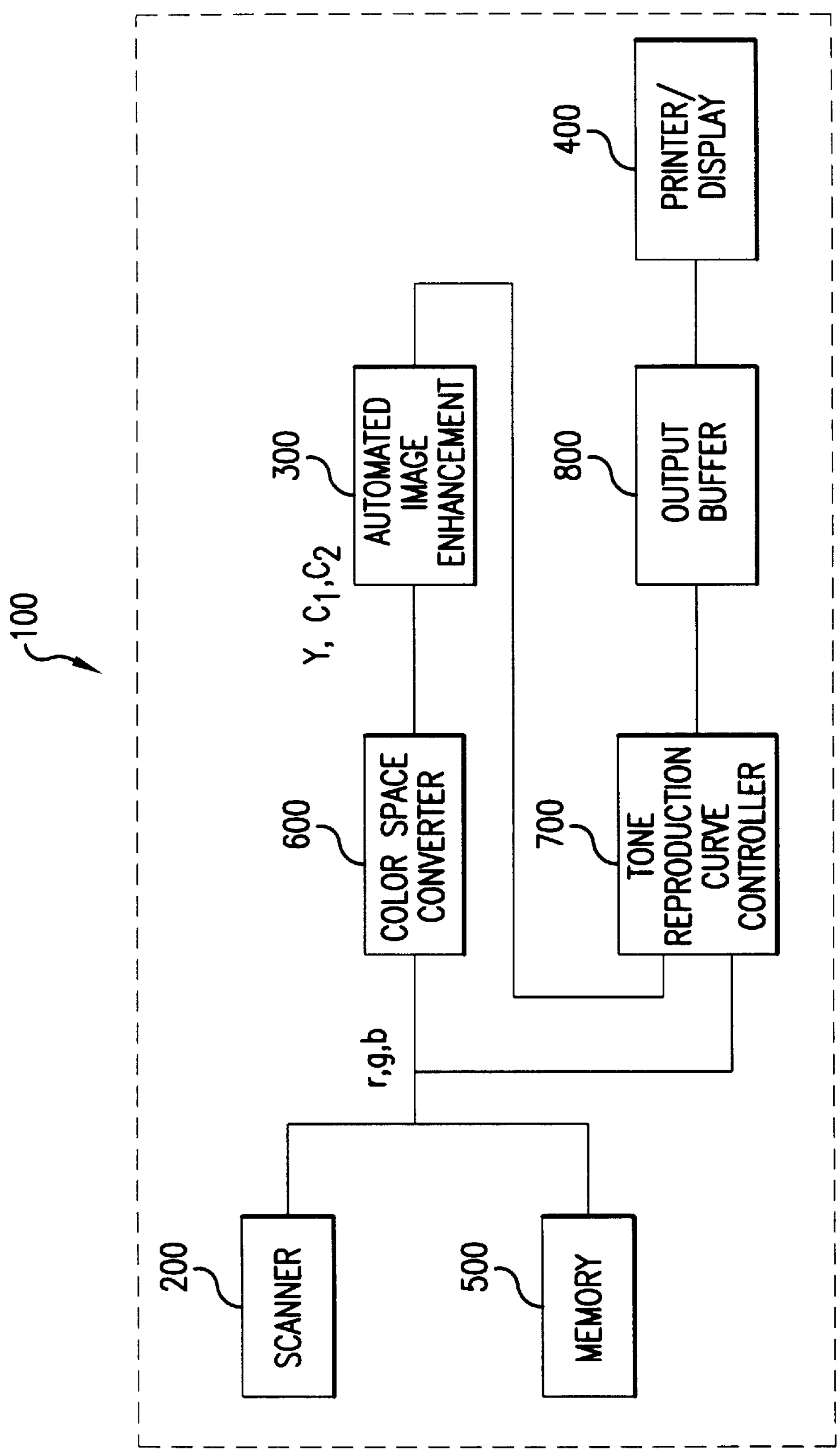
FIG. 1 is a block diagram of a system employing the present invention.

FIG. 1 illustrates a scan-to-print system 100 incorporating this invention. The system 100 includes an image digitizer, such as a scanner 200, which may be a black and white or color scanner which produces image signals defined in either RGB space for color images or density space for black and white images. The images of concern are pictorial in nature, i.e., they represent natural scenes. While certain computer generated imagery may qualify as representing natural scenes, the class of images contemplated as inputs to the system 100 are predominately scanned photographs.

The images themselves are defined in terms of pixels, wherein each pixel is an electrical or electronic signal with a digital gray value which varies between a white level (in this example system, a maximum value) and a black level (in this example system, a minimum value). In the system 100, which uses 8-bit pixels, 256 levels of gray are available. Pixels are also identified in terms of position, i.e., a pixel defines a unique area within the image identified by its position in a scanline, and the scanline's position in the image. Therefore, color is represented by an 8-bit gray pixel for each color separation of the image. Each 8-bit gray pixel defines the color in one separation. The color separations together form the color pixel. In most cases, there are three color separations.

The output of the scanner 200 is directed to an automated image enhancement system 300. The automated image enhancement system 300 includes a segmentation system which identifies a type of image within a document, and optionally a descreening system. The system 100 operates on continuous tone natural scene images. Thus, to operate on halftone images, the halftone images need to be descreened to recover the original continuous tone image. The output of the automated image enhancement system 300 is ultimately directed to a printer/display 400, which can be a printer, a CRT, or a similar output or display device. These devices may be laser printers, ink jet printers, LED displays or CRT displays. The printer/display 400 must be capable of representing gray pictorial images. The printer/display 400 preferably accomplishes this with gray printing and/or pseudo gray printing.

To derive the data needed for operating the system 100, a document may be prescanned by placing it on a copying platen and scanning it using the electro-optical system of the scanner 200 to produce a signal representing the document image. Alternatively, the image may be directed to the automated image enhancement system 300 from a memory 500, having previously been scanned or derived by some other system, in which case the received image is sampled as required.

The image need not be sampled at the ultimate resolution of the system. In practice, the automated image enhancement system 300 can use a relatively small number of pixels representative of and dispersed through the entire image to accurately represent the image. In the preferred embodiment, the system 100 uses a 512×512 block of pixels derived from the image. This selection improves the speed at which the image enhancement system 300 processes the pictorial images. Sampling at common image resolutions does not significantly improve the output of the image enhancement system 300, but does dramatically increase the processing time required by the image enhancement system 300. However, it is not necessary to undersample the image.

The natural scene images defined in terms of RGB space are initially directed to a color space converter 600, which converts the RGB pixel values to a selected color space for enhancement processing. The output of color space converter 600 is processed by the automated image enhancement device 300. The automated image enhancement device 300 produces a signal that drives the tone reproduction curve controller. The tone reproduction curve controller 700 transmits the processed data to an optional output buffer 800, for subsequent transfer to the printer/display device 400. It should be appreciated that the TRC controller 700 may work separately or integrally with the TRC controller that is commonly used to adjust the device independent data stream to the device dependent data used for printing or display.

The initial color image data signal received from the scanner 200 is assumed to be in RGB space. This RGB signal is converted to a luminance space signal ($YC_1C_2$) by the color space converter 600. However, it is possible that the image will already be a luminance space signal, as converting RGB values to luminance/chrominance space is commonly used for other image processing. $YC_1C_2$ space is a useful space in which the methods of this invention are preferably performed. YES space is one possible embodiment of $YC_1C_2$ space. Other color space embodiments may be used. However, the color space used must have a component which relates to the human visual perception of lightness or darkness, such as the Y-component of YES color space. The system and method of the present invention will be described using the YES color space.

The automated image enhancement device 300 enhances the image data. As part of the enhancement function, the input image's exposure and contrast may be changed. For visually dark images, the input image data is "lightened" by an exposure control mechanism, as described in the incorporated '538 patent. One common artifact of "lightening" dark images is the associated amplification of input image noise. For strong exposure changes, this noise amplification becomes objectionable.

Another optional process performed by the automated image enhancement device 300 is the adjustment of image contrast. For visually low contrast images, the input image data is "contrast enhanced" by a contrast control mechanism, as described in the incorporated '502 patent. One common artifact of "contrast enhancing" low contrast images is the associated amplification of input image noise. For strong contrast changes, this noise amplification becomes objectionable in slowly varying regions.

Figure 2:
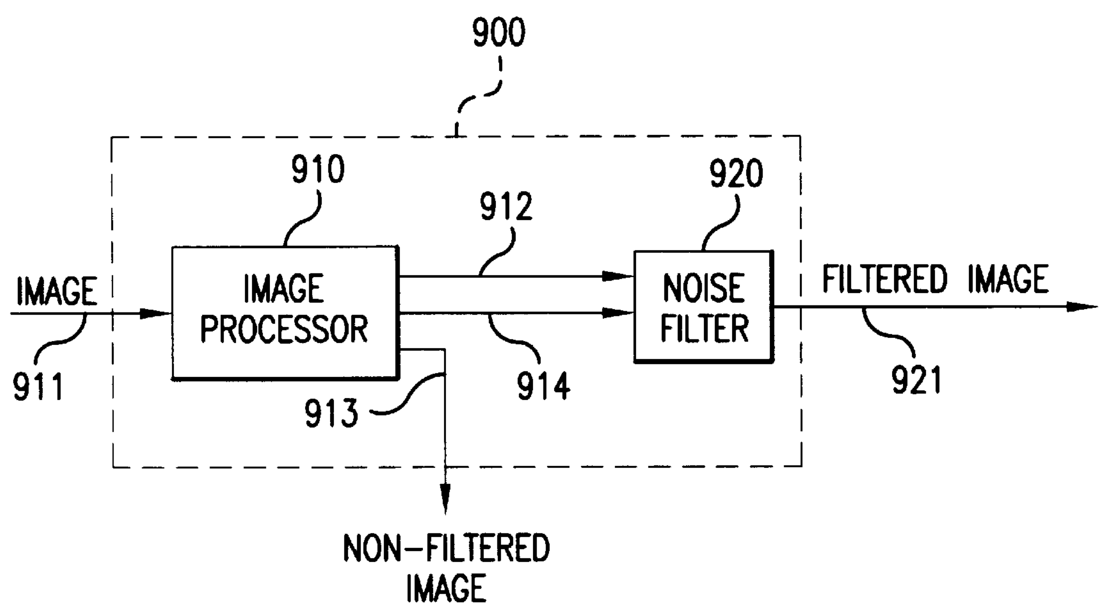
FIG. 2 is a block diagram of a preferred embodiment of the selective noise-filtering system of this invention.

FIG. 2 illustrates a preferred embodiment of the selective noise-filtering system 900 of this invention, which is preferably implemented in the automated image enhancement system 300. The image data is input to an image processor 910 over a signal line 911. The image processor 910 outputs the image data to a noise filter 920 over a signal line 912, or out of the selective noise-filtering system 900 over a signal line 913. The image processor 910 outputs control signals over a signal line 914 to the noise filter 920. The noise filter 920 outputs the noise-filtered image over a signal line 921.

In operation, the image processor 910 determines the likelihood that the image data is "noisy" by evaluating predetermined image noise indicators, as will be described in more detailed below. If the image processor 910 determines that image data is likely noisy, it sends the image data to the noise filter 920 for noise filtering. Otherwise, it directs the non-filtered image data out of the noise-filtering system 900.

In a first preferred embodiment, the image processor 910 sends the image data to the noise filter 920 only if the image is darker than a first predetermined threshold and the image's contrast is below a second predetermined threshold. The noise filter 920 preferably comprises a single modified sigma filter, such as the filter described in Lee, "Digital Image Smoothing and the Sigma Filter," Computer Vision, Graphics, and Image Processing, vol. 24, pp. 255–269, 1983. The modified sigma filter 920 reduces both random noise and shot a user does noise. Thus, a user does not have to monitor the type of noise present in the image to manually select between a random noise filter and a shot noise filter.

Figure 3:
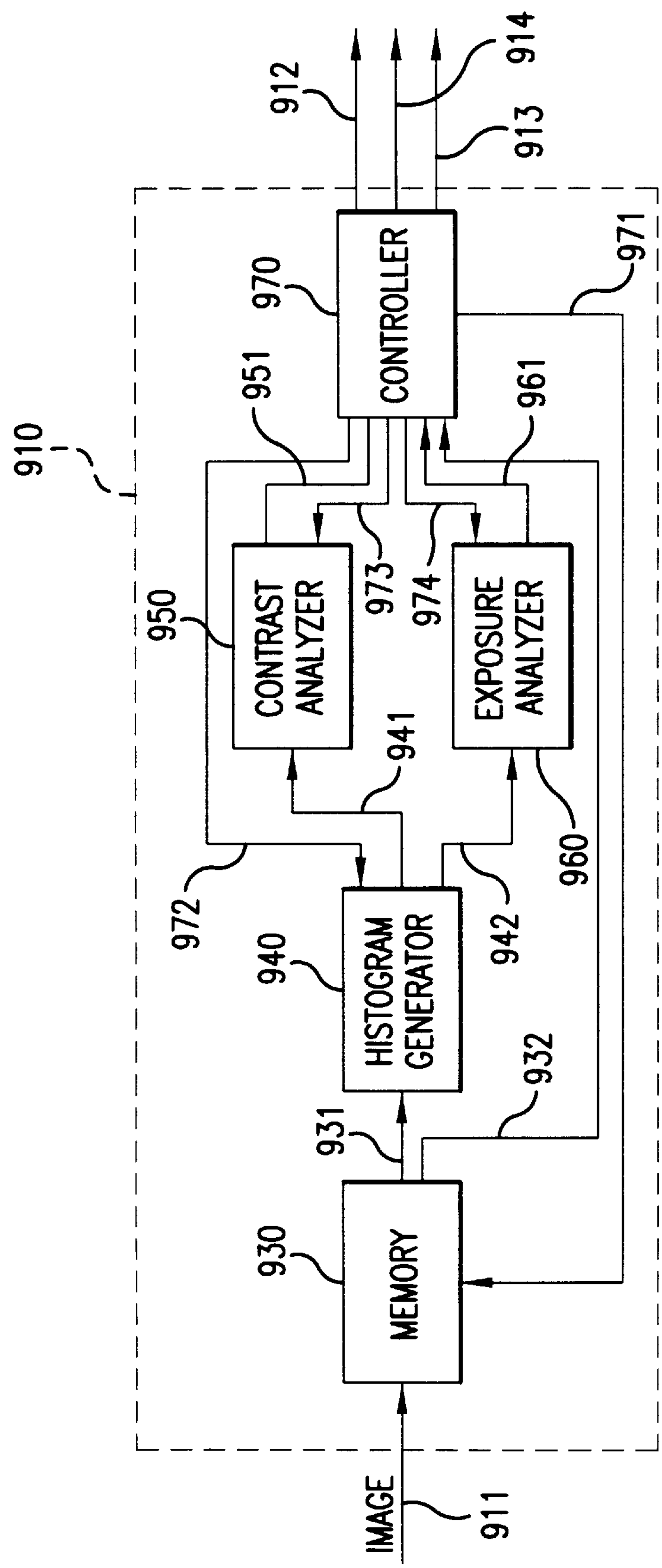
FIG. 3 is a block diagram of a preferred image processor used in the selective noise-filtering system of this invention.

FIG. 3 illustrates a preferred embodiment for the image processor 910 used in this invention. The image processor 910 includes a memory 930, a histogram generator 940, a contrast analyzer 950, an exposure analyzer 960 and a controller 970.

The image data is input to the memory 930 over the signal line 911. The image data is output from the memory 930 to the histogram generator 940 and the controller 970 over signal lines 931 and 932, respectively. The histogram generator 940 generates histograms that are output to the contrast analyzer 950 and the exposure analyzer 960 over signal lines 941 and 942, respectively. The contrast analyzer 950 outputs image contrast indicators to the controller 970 over a signal line 951, while the exposure analyzer 960 outputs image exposure indicators to the controller 970 over a signal line 961. The controller 970 outputs control signals to the memory 930, the histogram generator 940, the contrast analyzer 950 and the exposure analyzer 960 over signal lines 971, 972, 973 and 974, respectively.

Figure 4:
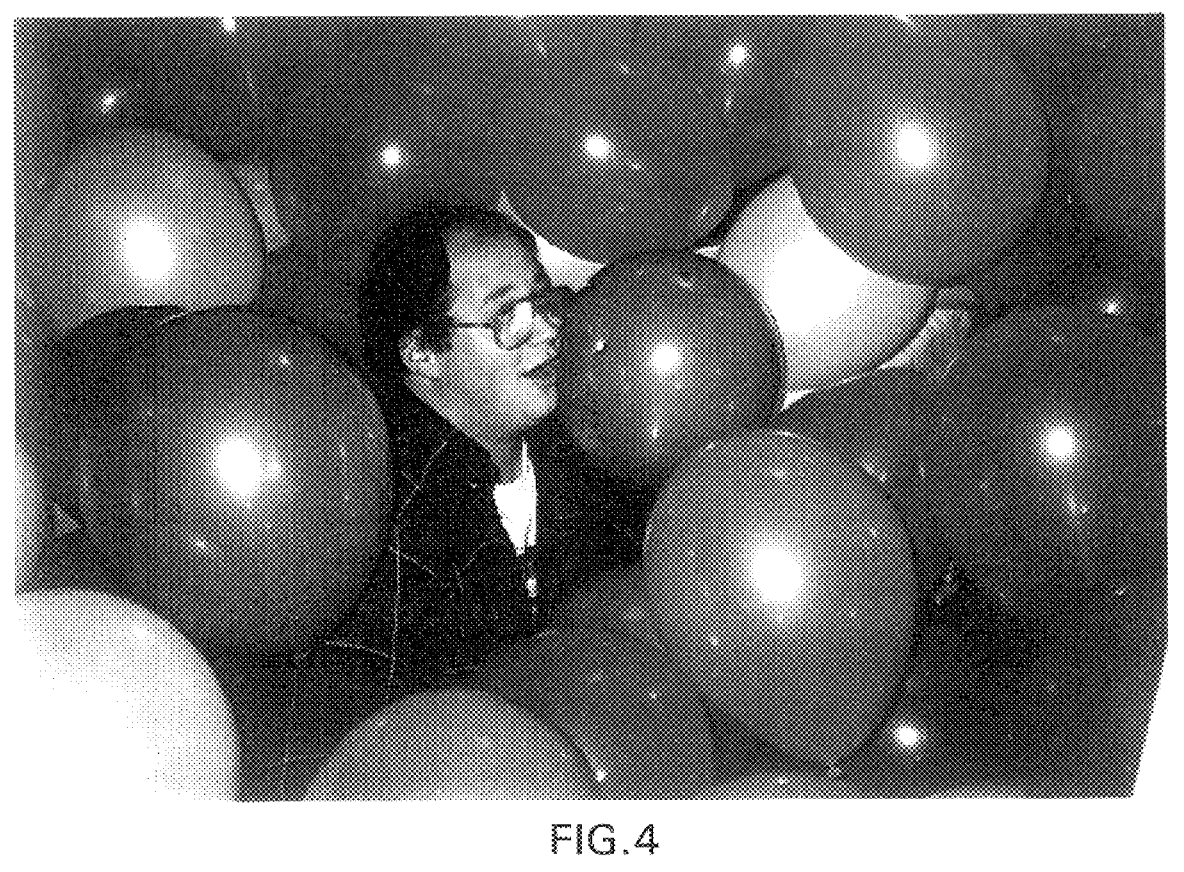
Figure 5:
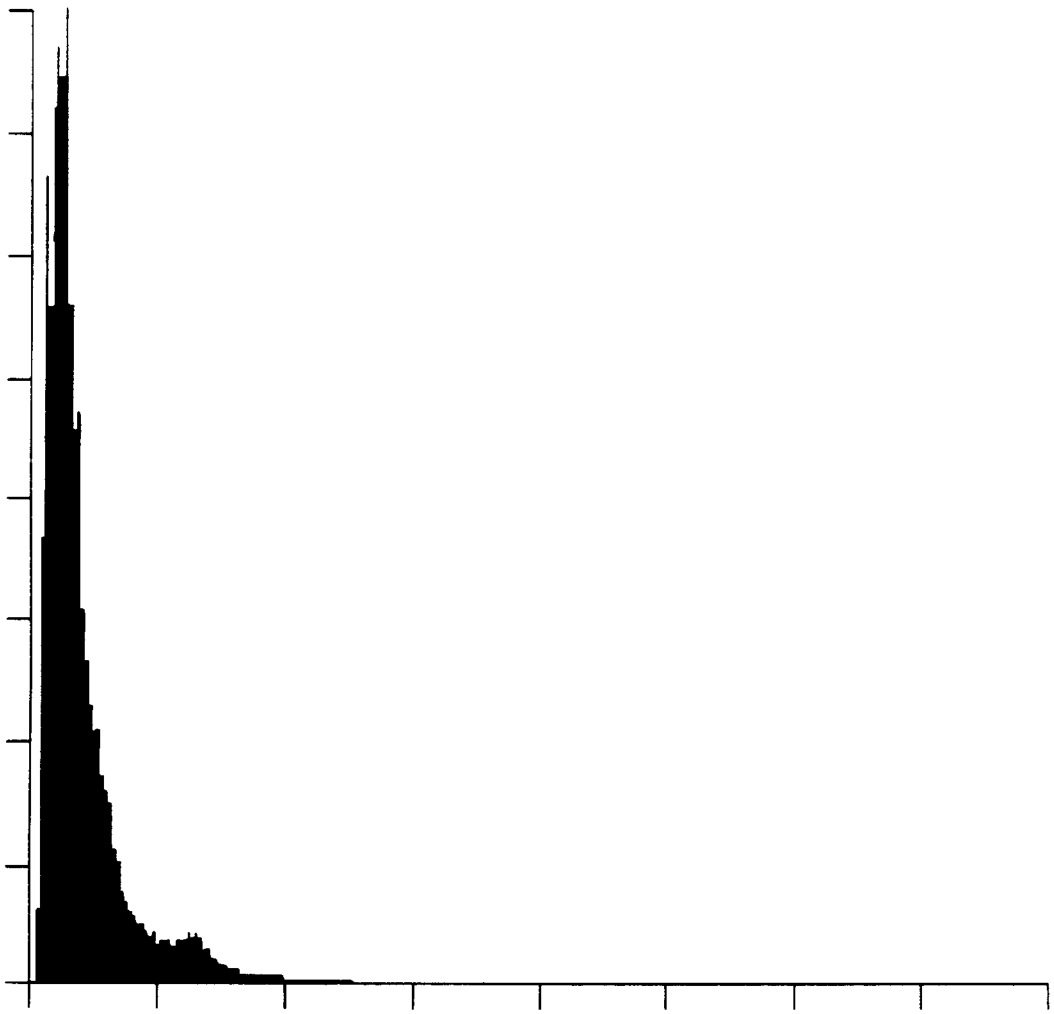
FIG. 5 shows a histogram derived from the image of FIG. 4.

FIG. 4 shows an unfiltered input image having shot and random noise. The histogram generator 940 generates a global histogram of the luminance or Y-component of the image of FIG. 4. The global histogram shown in FIG. 5 shows the populations of pixels at each luminance value possible in the image. The global histogram of FIG. 5 corresponds to the entire image of FIG. 4. If multiple bits are used for each color separation, such as 8-bits, the luminance values will be between 0 and 255.

Figure 7:
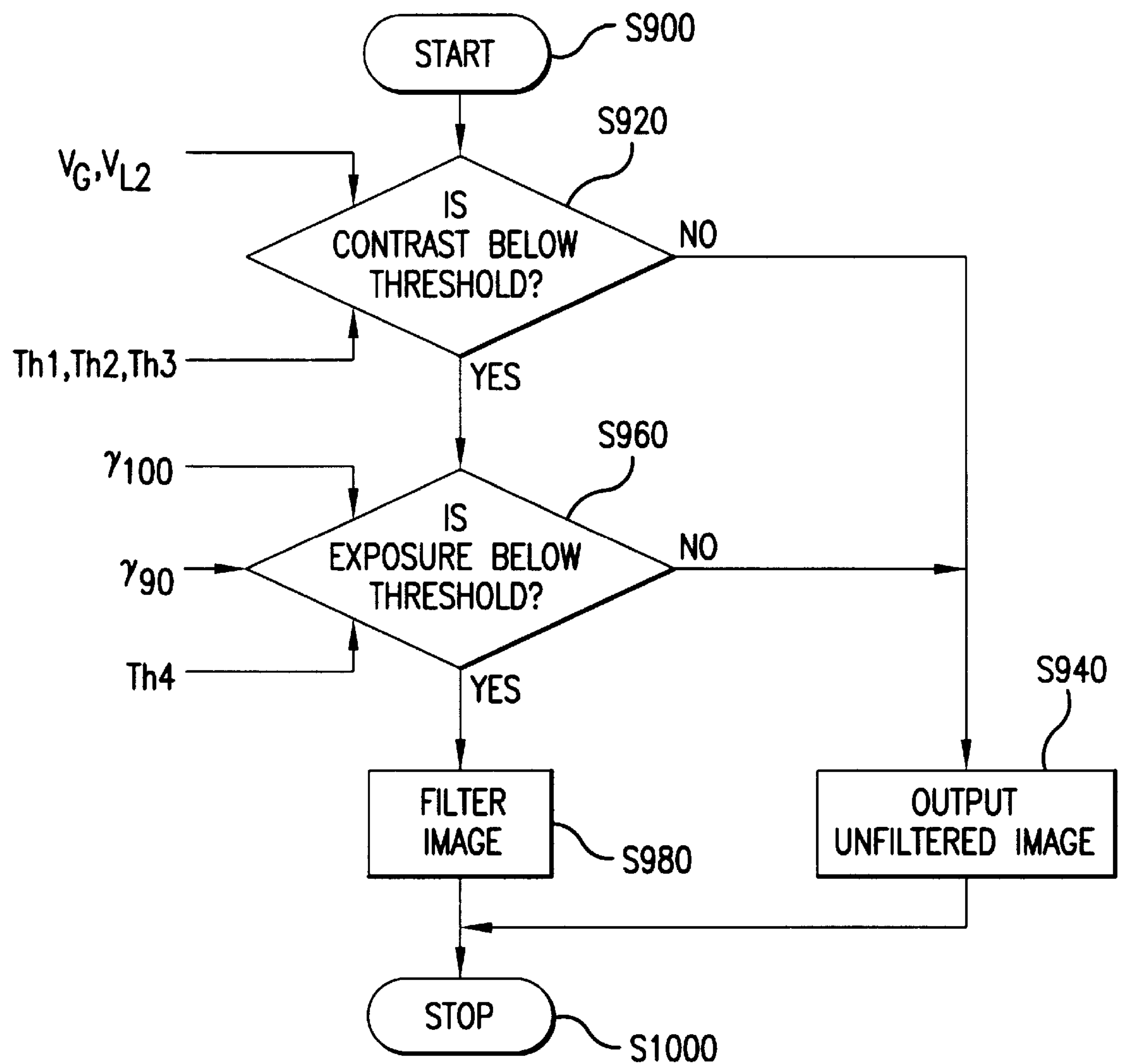
FIG. 7 is a flowchart of a preferred control routine for the selective noise-filtering system of this invention.

In addition to generating a global histogram of the entire image, the histogram generator 940 also divides the image into a set of local areas, not necessarily identical in size, or ordered in any fashion, and generates a histogram for each local area. FIG. 7 shows the local histograms generated for corresponding local areas of the image of FIG. 4. The histogram generator 940 generates the local area histograms for the image because visual contrast is not a global phenomenon. For example, some local areas may not exhibit full dynamic range, while others do. Also, the analysis of local areas gives some indication of the relative importance of individual image areas. In addition, large background areas, which are irrelevant to contrast adjustment, tend to skew the global histogram in a manner that makes contrast determination difficult. The histogram generator 940 reduces the influence of these large background areas by generating local histograms.

The histogram generator 940 outputs the global and local histogram to the contrast analyzer 950. The contrast analyzer 950 calculates a global contrast variance value $V_G$ from the global histogram and local area contrast variance values $V_{Li}$ from the local histograms. The contrast variance values are calculated using the techniques disclosed in the incorporated '502 patent. Briefly, the contrast analyzer 950 calculates the contrast variance values $V_G$ and $V_{Li}$ by comparing the global and local histograms to a flat reference histogram. A flat reference histogram is a reference signal which provides a uniform number of pixel counts for each density or luminance value possible within the image. The global and local histograms are compared to this flat reference histogram to give a global and local measure of contrast in the form of a variance value. Higher contrast variance values correspond to lower image contrast, while lower contrast indicator values correspond to lower image contrast. The contrast analyzer 950 outputs the contrast variance values $V_G$ and $V_{Li}$ to the controller 970.

The exposure analyzer 960 receives the global histogram values from histogram generator 940 and calculates at least one exposure indicator value, and preferably two exposure indicator values $\gamma_{100}$ and $\gamma_{90}$, using the techniques disclosed in the incorporated '538 patent. $\gamma_{100}$ is an exposure indicator value calculated by the exposure analyzer 960 using the entire global histogram for the image. To ensure that the results of the exposure calculation do not rely on image aberrations at the ends of the dynamic range, the exposure analyzer 960 also calculates the exposure indicator value $\lambda_{90}$ using the middle 90% of the global histogram data for the image. Higher exposure indicator values correspond to a lighter image, while lower exposure indicator values correspond to a darker image. The exposure indicator values $\gamma_{100}$ and $\gamma_{90}$ are output to the controller 970.

The controller 970 determines the likelihood that image is "noisy" by comparing the contrast variance values $V_G$, $V_{Li}$ and the exposure indicator values $\gamma_{100}$ and $\gamma_{90}$ to predetermined threshold values. If the controller 970 determines that the image is noisy, it sends the image data to the noise filter 920. Otherwise, it outputs the image data out of the selective noise-filtering system 900.

FIG. 7 shows a preferred control routine for the conditional noise-filtering system 900 of this invention. The routine starts at step S900 and proceeds to step S920, where the controller 970 determines if the image contrast is below a first predetermined threshold. If the image contrast is below the first predetermined threshold, at step S940 the controller 970 outputs the unfiltered image. Otherwise, control continues to step S960.

In step S960, the controller 970 determines if the image exposure is below a second predetermined threshold.

If the image exposure is not below the second predetermined threshold, control jumps to step S940, where the controller 970 outputs the unfiltered image. Otherwise, control continues to step S980.

In step S980, the controller 970 filters the image data for both random noise and shot noise, preferably using the methods described in Lee. The control system then continues to step S1000. In step S1000, the control routine stops.

It should be appreciated that, although the preferred control routine of FIG. 7 evaluates both the image's contrast (at step S920) and the image's exposure (at step S960) to determine the likelihood that noise is present in the image, the control routine could evaluate only the image's contrast or only the image's exposure to make the noise determination.

If only the image's contrast is evaluated, step S960 would be eliminated from the control routine of FIG. 7, and control would jump to step S980 if the controller 970 determines that the image's contrast is below threshold. If only the image's exposure is evaluated, step S920 would be eliminated from the control routine of FIG. 7, and control would proceed directly to step S960 from step S900.

Figure 8:
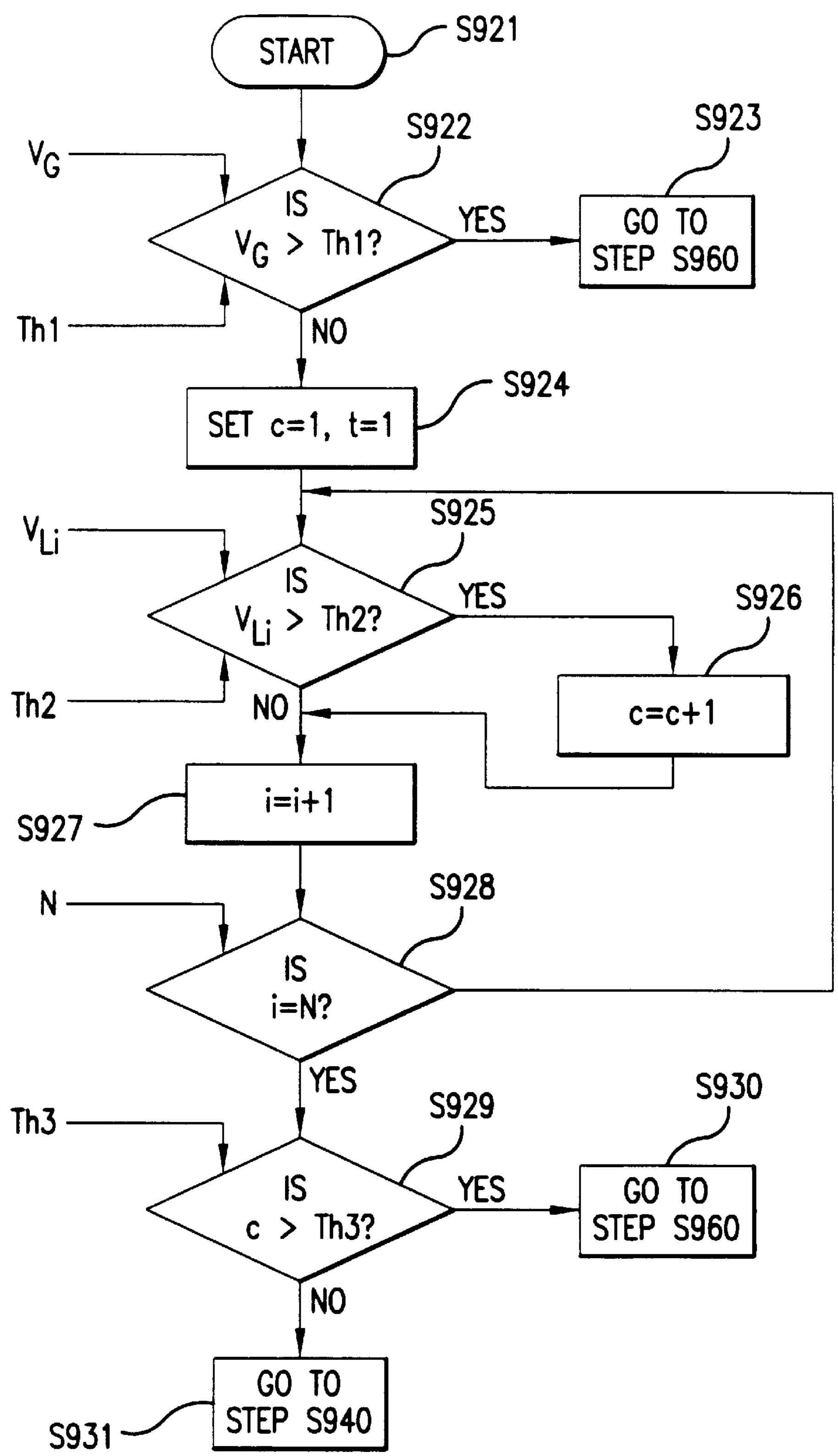
FIG. 8 is a flow chart of a preferred control routine for the contrast determination step of FIG. 7.

FIG. 8 shows a preferred control routine for determining if the image contrast is below the first predetermined threshold of step S920.

The control routine starts at step S921 and continues to step S922, where the control system determines if the global contrast variance value $V_G$ is greater than the first threshold value Th1. In the preferred embodiment, the threshold value Th1 is preferably set to 50. However, the threshold value Th1 may be adjusted up or down in order to achieve a desired balance between system performance and noise reduction.

If $V_G$ is greater than Th1, the controller 970 determines that the image's contrast is below threshold (indicating that the image is likely noisy), and the control routine jumps to step S923, which returns the control routine to step S930. Otherwise, the routine continues to step S924. In step S923, a counter i and a counter c are set to 1. The counter i indicates which local area contrast variance value is to be compared against the second threshold Th2. In step S925, the controller 970 determines if a first local area contrast variance value $V_{L1}$ is greater than the threshold value Th2. In the preferred embodiment, the threshold value Th2 is preferably set to 100. However, the threshold value Th2 may be adjusted up or down in order to achieve a desired balance between system performance and noise reduction.

If $V_{L1}$ is greater than Th2, the control routine jumps to step S926. Otherwise, the control routine continues to step S927. In step S926, the control routine increments the counter c by 1. Control then continues to step S927.

At step S927, the control system increments counter i by 1, and control continues to step S928. At step S928, the control system determines if i is equal to N, where N is the total number of local area contrast variance values $V_{Li}$. If i is not equal to N, the control system jumps back to step S925, where it compares the second contrast variance value $V_{L2}$ to threshold value Th2. If i is equal to N, the control system determines that all local area contrast variance values have been compared to threshold value Th2, and control continues to step S929.

Figure 6:
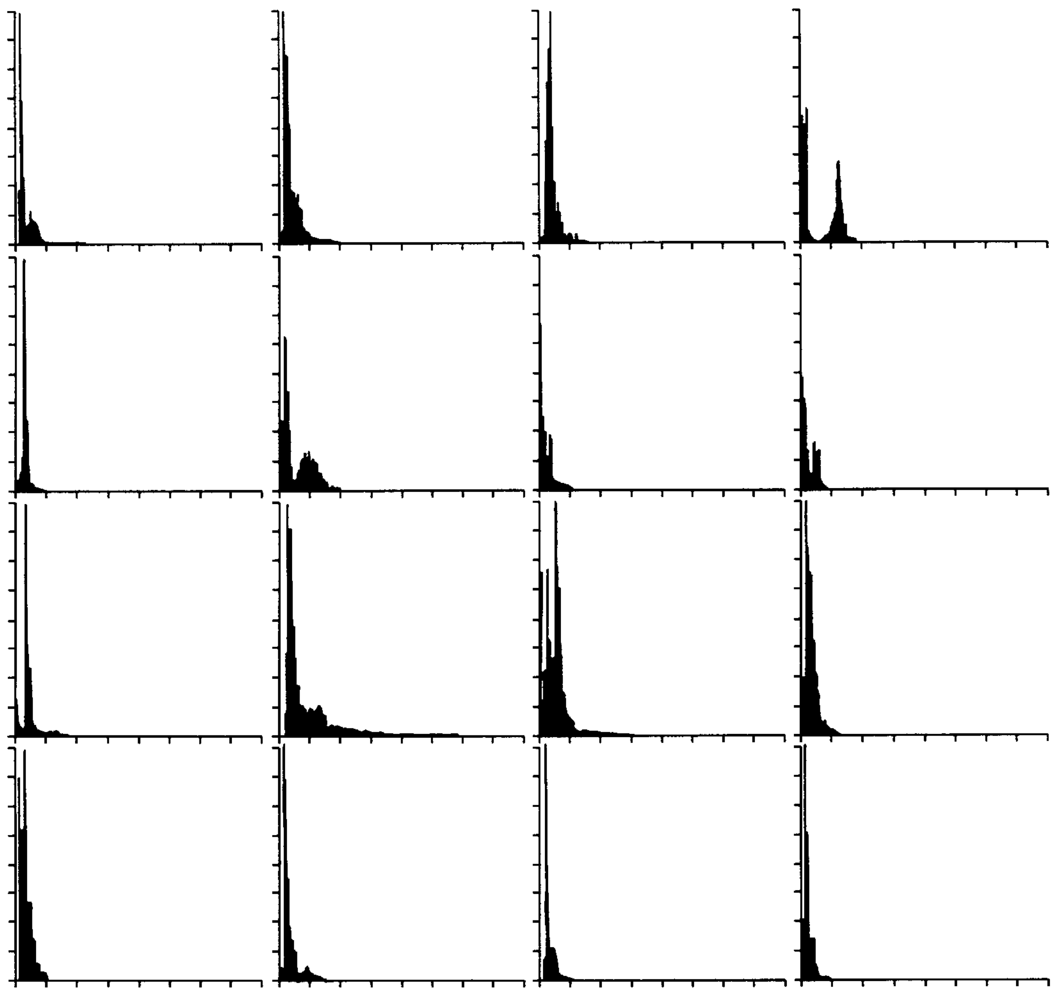
FIG. 6 shows histograms for corresponding local areas of the image of FIG. 4.

At step S929, the control system determines if counter c is greater than threshold value Th3, where c represents the total number of local area contrast variance values that are greater than threshold value Th2. In the preferred embodiment, the threshold value Th3 is preferably set to 0.25M, where M is the total number of local area histograms. As shown in FIG. 6, 16 local area histograms were generated for the image of FIG. 4. For this example, Th3 is preferably set to 4 (0.25*16). However, the threshold value Th3 may be adjusted up or down in order to achieve a desired balance between system performance and noise reduction.

If c is greater than Th3, the controller 970 determines that the image's contrast is below threshold (indicating that the image is likely noisy), and control continues to step S930. Otherwise, control continues to step S931. At step S930, the control system returns the control routine to step S960. At step S931, the control system returns the control routine to step S940.

Although the preferred control routine of FIG. 8 evaluates both the global contrast variance values $V_G$ and the local area contrast variance values $V_{Li}$ to determine if the image contrast is below the predetermined threshold, this is not required. The control routine could evaluate only the global contrast variance value $V_G$, or only the local area contrast variance values $V_{Li}$, and still fall within the scope of the methods of this invention.

Figure 9:
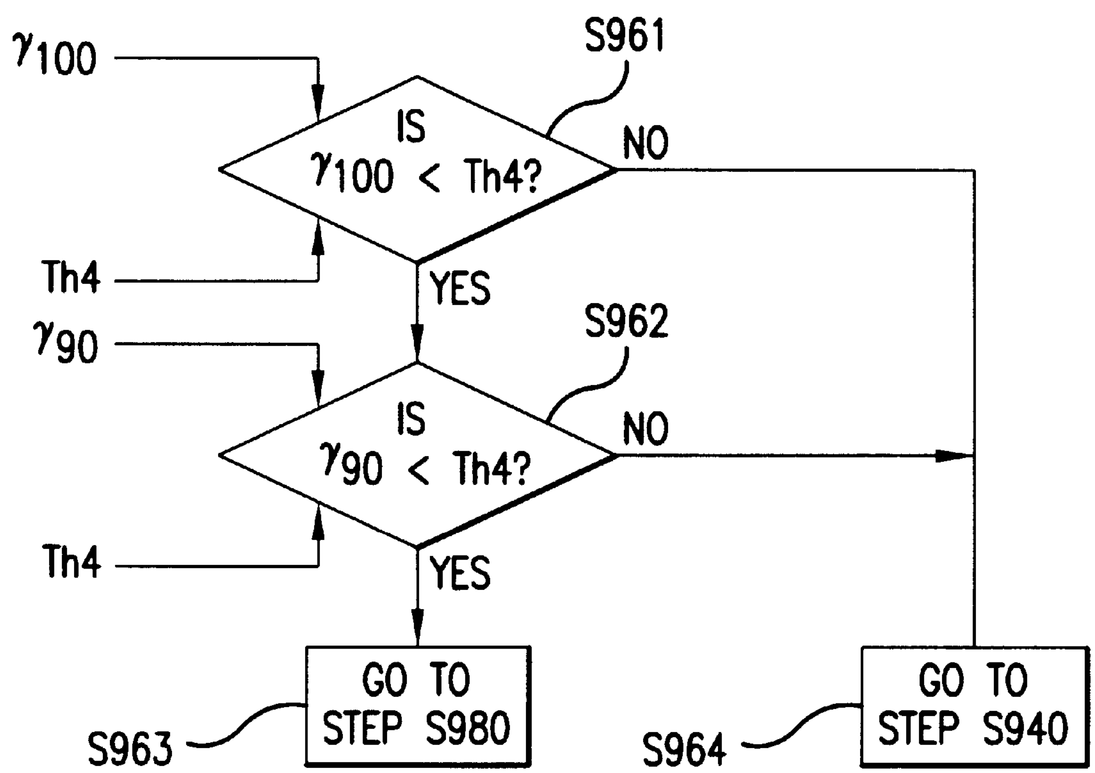
FIG. 9 is a flow chart of a preferred control routine for the exposure determination step of FIG. 7.

FIG. 9 shows a preferred control routine for determining if the image exposure is below the second predetermined threshold of step S960.

In step S961, the controller 970 determines if the exposure indicator $\gamma_{100}$ is less than the second predetermined threshold value Th4. In the preferred embodiment, the threshold value Th4 is preferably set to 2. However, the threshold value Th4 may be adjusted up or down in order to achieve a desired balance between system performance and noise reduction.

If $\gamma_{100}$ is less than Th4, control continues to step S962. Otherwise, control jumps to step S964. At step S962, the controller 970 determines if the exposure indicator $\gamma_{90}$ is less than the threshold value Th4. If $\gamma_{90}$ is less than Th4, the controller 970 determines that the image's exposure is below threshold (indicating that the image is likely noisy), and control continues to step S963. Otherwise control jumps to step S964.

At step S963, the control system returns the control routine to step S980. At step S964, the control system returns the control routine to step S940.

Although the preferred control routine of FIG. 9 evaluates two exposure indicators $\lambda_{100}$ and $\lambda_{90}$ to determine if the image exposure is below the predetermined threshold, this is not required. For example, the control routine could evaluate only one exposure indicator and still fall within the scope of the methods of this invention.

The conditional noise-filtering system 900 is preferably implemented on a programmed general purpose computer. However, it can also be implemented on a special purpose computer, a programmed microprocessor or a microcontroller and peripheral integrated circuit elements, an ASIC or other integrated circuit, a hardwired electronic or logic circuit such as a discreet element circuit, a programmable logic device such as a POD, POA or PAL, or the like. In general, any device on which a finite state machine capable of implementing the flow charts shown in FIGS. 7, 8 and 9 can be used to implement the conditional noise-filtering system 900 of this invention.

Figure 10:
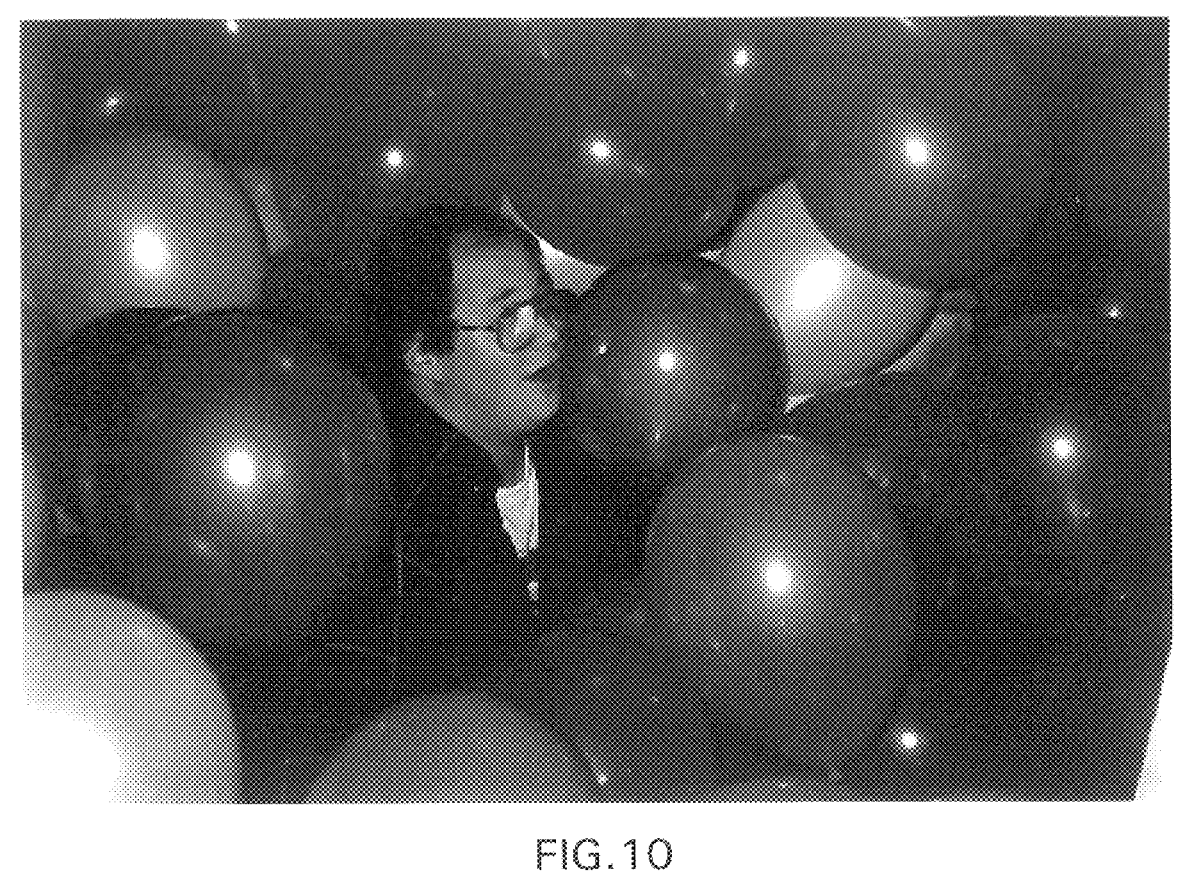

FIG. 10 shows an image corresponding to FIG. 4, where both random noise and shot noise are filtered using the conditional noise-filtering methods of this invention. As discussed above, the threshold values Th1–Th4 are preferably adjusted so that only those images in need of noise filtering are filtered, while other images are processed without the additional performance overhead required by the noise filter.

While this invention has been described in conjunction with the specific embodiments outlined above, it is evident that many alternatives, modifications and variations will be apparent to those skilled in the art. As explained above, although the preferred embodiments of the system and method determine the likelihood that noise is present in the image based on the image's contrast and exposure, the system and method can make a noise determination based only on the image's contrast or only on the image's exposure. Accordingly, the preferred embodiments of the invention as set forth above are intended to be illustrative not limiting. Various changes may be made without departing from the spirit and scope of the invention as defined in the following claims.

What is claimed is:

1. A selective noise filtering system for selectively filtering images, comprising:

a noise filter;

an image processor that receives an original image, determines if at least one contrast variance value representative of noise in the original image is above a corresponding predetermined threshold, and outputs the original image to the noise filter if the at least one contrast variance value is above the corresponding predetermined threshold, comprising:

a histogram generator that generates from the image at least one of a global histogram and at least one local area histogram, a contrast analyzer that generates the at least one contrast variance value based on the at least one of the a global histogram and the at least one local area histogram, and a controller that controls the histogram generator and the contrast analyzer.

2. A selective noise filtering system for selectively filtering images, comprising:

a noise filter;

an image processor that receives an original image, determines if at least one exposure indicator representative of noise in the original image is above a corresponding predetermined threshold, and outputs the original image to the noise filter if the at least one exposure indicator is above the corresponding predetermined threshold, comprising:

a histogram generator that generates from the image at least one of a global histogram and at least one local area histogram, an exposure analyzer that generates at least one exposure indicator based on the at least one of a global histogram and the at least one local area histogram, and a controller that controls the histogram generator and the exposure analyzer.

3. A selective noise filtering system for selectively filtering images, comprising:

a noise filter; and an image processor that receives an original image, determines if at least one of at least one contrast variance value and at least one exposure indicator representative of noise in the original image is above a corresponding predetermined threshold, and outputs the original image to the noise filter if the at least one of at least one contrast variance value and at least one exposure indicator is above the corresponding predetermined threshold, comprising:

a histogram generator that generates from the image at least one of a global histogram and at least one local area histogram, a contrast analyzer that generates at least one contrast variance value based on the at least one of a global histogram and the at least one local area histogram, an exposure analyzer that generates at least one exposure indicator based on the at least one of a global histogram and the at least one local area histogram, and a controller that controls the histogram generator, the contrast analyzer and the exposure analyzer.

4. The system of claim 3, wherein the exposure analyzer generates two exposure indicators.

5. The system of claim 4, wherein the contrast analyzer generates a global contrast variance value based on the global histogram, and at least one local area contrast variance value based on the at least one local area histogram.

6. The system of claim 5, wherein the controller outputs the image to the noise filter when:

$$V_G < Th1,$$

and $$\gamma_{100} > Th4$$

wherein:

$V_G$ is the global contrast variance value;

$\gamma_{100}$ is an exposure indicator;

Th1 is a first predetermined contrast threshold value; and

Th4 is second predetermined exposure threshold value.

7. The system of claim 5, wherein the controller outputs the image to the noise filter when:

$$V_G > Th1;$$

$$\gamma_{100} < Th4;$$

and $$\gamma_{90} < Th4$$

wherein:

$V_G$ is the global contrast variance value;

$\gamma_{100}$ is a first exposure indicator;

$\gamma_{90}$ is a second exposure indicator;

Th1 is a predetermined contrast threshold value; and

Th4 is predetermined exposure threshold value.

8. The system of claim 5, wherein the controller outputs the image to the noise filter when:

$$c > Th3;$$

and $$\gamma_{100} < Th4$$

wherein:

c is the number of local area contrast variance values that are greater than the predetermined contrast threshold value;

Th3 is a predetermined threshold value; and

Th4 is a predetermined exposure threshold value.

9. The system of claim 5, wherein the controller outputs the image to the noise filter when:

$$c > Th3;$$

$$\gamma_{100} < Th4;$$

and $$\gamma_{90} < Th4$$

wherein:

c is the number of local area contrast variance values that are greater than the predetermined contrast threshold value;

Th3 is a predetermined threshold value; and

Th4 is a predetermined exposure threshold value.

10. The system of claim 3, wherein the image processor further comprises a memory that temporarily stores the image.

11. A scan-to-print imaging system, comprising:

an image digitizer that digitizes an original image and outputs a signal representative of the image, the signal being in a first color space; and an automated image enhancement device that inputs the signal and outputs an enhanced signal, the automated image enhancement device enhancing a perceived quality of an image represented by the enhanced signal, the automated image enhancement device comprising:

a noise filter outputting the enhanced signal; and an image processor that receives the signal, determines if noise in the signal corresponding to noise in the original image is above a predetermined threshold, and outputs the signal to the noise filter if the noise in the converted signal is above the predetermined threshold, wherein the predetermined threshold is set so that the automated image enhancement device outputs the enhanced signal within a predetermined response time.

12. A scan-to-print imaging system, comprising:

an image digitizer that digitizes an original image and outputs a signal representative of the image, the signal being in a first color space; and an automated image enhancement device that inputs the signal, and outputs an enhanced signal, the automated image enhancement device enhancing a perceived quality of an image represented by the enhanced signal, the automated image enhancement device comprising:

a noise filter outputting the enhanced signal;

an image processor that receives the signal, determines if noise in the signal corresponding to noise in the original image is above at least one predetermined threshold, and outputs the signal to the noise filter if the noise in the signal is above the at least one predetermined threshold, comprising:

a histogram generator that generates from the image at least one of a global histogram and at least one local area histogram, a contrast analyzer that generates at least one contrast variance value based on the at least one of a global histogram and the at least one local area histogram, an exposure analyzer that generates at least one exposure indicator based on the at least one of a global histogram and the at least one local area histogram, and a controller that controls the histogram generator, the contrast analyzer and the exposure analyzer, wherein the at least one contrast variance value and the at least one exposure indicator are indicative of the noise in the signal.

13. The system of claim 12, wherein the exposure analyzer generates two exposure indicators.

14. The system of claim 13, wherein the contrast analyzer generates a global contrast variance value based on the global histogram, and at least one local area contrast variance value based on the at least one local area histogram.

15. The system of claim 14, wherein the controller outputs the converted signal to the noise filter when:

$$V_G > Th1,$$

and $$\gamma_{100} < Th4$$

wherein:

$V_G$ is the global contrast variance value;

$\gamma_{100}$ is an exposure indicator;

Th1 is a first predetermined contrast threshold value; and

Th4 is second predetermined exposure threshold value.

16. The system of claim 14, wherein the controller outputs the converted signal to the noise filter when:

$$V_G > Th1;$$

$$\gamma_{100} < Th4;$$

and $$\gamma_{90} < Th4$$

wherein:

$V_G$ is the global contrast variance value;

$\gamma_{100}$ is a first exposure indicator;

$\gamma_{90}$ is a second exposure indicator;

Th1 is a predetermined contrast threshold value; and

Th4 is predetermined exposure threshold value.

17. The system of claim 14, wherein the controller outputs the converted signal to the noise filter when:

$$c > Th3;$$

and $$\gamma_{100} < Th4$$

wherein:

c is the number of local area contrast variance values that are greater than the predetermined contrast threshold value;

Th3 is a predetermined threshold value; and

Th4 is a predetermined exposure threshold value.

18. The system of claim 14, wherein the controller outputs the converted signal to the noise filter when:

$$c > Th3;$$

$$\gamma_{100} < Th4;$$

and $$\gamma_{90} < Th4$$

wherein:

c is the number of local area contrast variance values that are greater than the predetermined contrast threshold value;

Th3 is a predetermined threshold value; and

Th4 is a predetermined exposure threshold value.

19. The system of claim 12, wherein the image processor further comprises a memory that temporarily stores the image.

20. A method of selectively noise filtering images, comprising the steps of:

determining if noise in an original image is above a corresponding predetermined threshold, comprising:

generating from the image at least one of a global histogram and at least one local area histogram, generating at least one contrast variance value based on the at least one of a global histogram and the at least one local area histogram, generating at least one exposure indicator based on the at least one of a global histogram and the at least one local area histogram, comparing the at least one exposure indicator to a predetermined exposure threshold value, comparing the at least one contrast variance value to a predetermined contrast threshold value, and determining if at least one noise indicator of the at least one exposure indicator and the at least one contrast variance value is above the corresponding predetermined threshold based on results of the comparing steps; and filtering the original image if the at least one image noise indicator is above the predetermined threshold.

21. The method of claim 20, wherein a global contrast variance value based on the global histogram, and at least one local area contrast variance value based on the at least one local area histogram are calculated.

22. The method of claim 20, wherein two exposure indicators are generated.

23. The method of claim 22, wherein the image is filtered when:

$$V_G > Th1,$$

and $$\gamma_{100} < Th4$$

wherein:

$V_G$ is the global contrast variance value;

$\gamma_{100}$ is an exposure indicator;

Th1 is a first predetermined contrast threshold value; and

Th4 is second predetermined exposure threshold value.

24. The method of claim 22, wherein the image is filtered when:

$$V_G > Th1;$$

$$\gamma_{100} < Th4;$$

and $$\gamma_{90} < Th4$$

wherein:

$V_G$ is the global contrast variance value;

$\gamma_{100}$ is a first exposure indicator;

$\gamma_{90}$ is a second exposure indicator;

Th1 is a predetermined contrast threshold value; and

Th4 is predetermined exposure threshold value.

25. The method of claim 22, wherein the image is filtered when:

$$c > Th3;$$

and $$\gamma_{100} < Th4$$

wherein:

c is the number of local area contrast variance values that are greater than the predetermined contrast threshold value;

Th3 is a predetermined threshold value; and

Th4 is a predetermined exposure threshold value.

26. The method of claim 22, wherein the image is filtered when:

$$c > Th3;$$

$$\gamma_{100} < Th4;$$

and $$\gamma_{90} < Th4$$

wherein:

c is the number of local area contrast variance values that are greater than the predetermined contrast threshold value;

Th3 is a predetermined threshold value; and

Th4 is a predetermined exposure threshold value.

* * * * *